United States Patent
Bai et al.

(10) Patent No.: US 11,702,081 B2
(45) Date of Patent: Jul. 18, 2023

(54) SYSTEM AND METHOD FOR ROAD CONDITION MONITORING

(71) Applicant: Honda Motor Co., Ltd., Tokyo (JP)

(72) Inventors: Xue Bai, Novi, MI (US); Rajeev Chhajer, Powell, OH (US); Brian Mills Nutwell, Dublin, OH (US); Jose I. Herrero Zarzosa, Powell, OH (US); Ehsan Moradi-Pari, Dublin, OH (US); Kathiravan Natarajan, Ypsilanti, MI (US); Abolfazl Hajisami, Farmington Hills, MI (US)

(73) Assignee: HONDA MOTOR CO., LTD., Tokyo (JP)

(*) Notice: Subject to any disclaimer, the term of this patent is extended or adjusted under 35 U.S.C. 154(b) by 189 days.

(21) Appl. No.: 16/784,840

(22) Filed: Feb. 7, 2020

(65) Prior Publication Data

US 2020/0262438 A1   Aug. 20, 2020

Related U.S. Application Data

(60) Provisional application No. 62/813,635, filed on Mar. 4, 2019, provisional application No. 62/805,493, filed on Feb. 14, 2019.

(51) Int. Cl.
| | |
|---|---|
| *B60W 40/06* | (2012.01) |
| *G08G 1/01* | (2006.01) |
| *G08G 1/048* | (2006.01) |
| *G08G 1/16* | (2006.01) |
| *G06V 20/56* | (2022.01) |

(52) U.S. Cl.
CPC .......... *B60W 40/06* (2013.01); *G06V 20/588* (2022.01); *G08G 1/0112* (2013.01); *G08G 1/048* (2013.01); *G08G 1/161* (2013.01); *B60W 2552/00* (2020.02); *B60W 2756/10* (2020.02)

(58) Field of Classification Search
CPC ............ B60W 40/06; B60W 2756/10; B60W 2552/00; G08G 1/0112; G08G 1/048; G08G 1/161; G08G 1/096741; G08G 1/096775; G08G 1/0133; G08G 1/0141; G06K 9/00798; G06Q 30/0283
See application file for complete search history.

(56) References Cited

U.S. PATENT DOCUMENTS

| | | |
|---|---|---|
| 7,421,334 B2 | 9/2008 | Dahlgren et al. |
| 8,451,140 B2 | 5/2013 | Piccinini et al. |
| 9,092,981 B2 | 7/2015 | Suzuki et al. |

(Continued)

FOREIGN PATENT DOCUMENTS

| | | |
|---|---|---|
| CN | 207052095 | 2/2018 |
| WO | WO2018017793 | 1/2018 |
| WO | WO2018026603 | 2/2018 |

*Primary Examiner* — Thomas E Worden
*Assistant Examiner* — Daniel Tyler Reich
(74) *Attorney, Agent, or Firm* — Rankin, Hill & Clark LLP

(57) ABSTRACT

A method and system for road condition monitoring including receiving roadway data from connected vehicles in response to a third party request. The connected vehicles include sensors for capturing the roadway data. The method and system include determining a roadway condition based on the roadway data and calculating a data price based on the roadway condition and the roadway data. Further, the method and system include controlling access to the roadway data according to the data price.

8 Claims, 10 Drawing Sheets

(56) References Cited

U.S. PATENT DOCUMENTS

| | | |
|---|---|---|
| 9,384,597 B2 | 7/2016 | Koch et al. |
| 9,560,490 B2 | 1/2017 | Velusamy |
| 9,863,928 B1 | 1/2018 | Peterson et al. |
| 9,868,332 B2 | 1/2018 | Anderson et al. |
| 2003/0225668 A1* | 12/2003 | Goto .................. G06Q 10/047 |
| | | 705/37 |
| 2009/0234859 A1* | 9/2009 | Grigsby ................ G08G 1/161 |
| 2011/0087430 A1* | 4/2011 | Boss .................. G06Q 20/145 |
| | | 701/533 |
| 2016/0078554 A1* | 3/2016 | Cote ..................... G07C 5/008 |
| | | 705/4 |
| 2016/0086285 A1* | 3/2016 | Jordan Peters .. G08G 1/096827 |
| | | 705/4 |
| 2018/0053405 A1 | 2/2018 | de Azevedo et al. |
| 2018/0144639 A1* | 5/2018 | Kumar .................. G08G 1/202 |
| 2019/0279247 A1* | 9/2019 | Finken ................ G06Q 20/065 |

\* cited by examiner

SYSTEM AND METHOD FOR ROAD CONDITION MONITORING

RELATED APPLICATIONS

This application claims priority to U.S. Prov. Application Ser. No. 62/805,493 filed on Feb. 14, 2019 which is expressly incorporated herein by reference. This application also claims priority to U.S. Prov. Application Ser. No. 62/813,635 filed on Mar. 4, 2019, which is also expressly incorporated herein by reference.

BACKGROUND

Road users are impacted by various conditions including weather, road conditions, roadwork, and congestion. Timely detection of the various conditions can improve awareness of road conditions and improve the efficiency of road maintenance operation. Data from vehicle onboard sensors can be used to detect or infer the various conditions, and shared via communication with other vehicles and infrastructures.

BRIEF DESCRIPTION

According to one aspect, a computer-implemented method for road condition monitoring includes receiving roadway data from connected vehicles in response to a third party request. The connected vehicles include sensors for capturing the roadway data. The method includes determining a roadway condition based on the roadway data and calculating a data price based on the roadway condition and the roadway data. Further, the method includes controlling access to the roadway data according to the data price.

According to another aspect, a system for road condition monitoring includes a plurality of connected devices for sensing roadway data and a processor operatively connected for computer communication using a communication network to the connected devices. The processor receives the roadway data from the plurality of connected devices according to a third party request and determines a roadway condition based on the roadway data. The processor calculates a data price based on the roadway condition and the roadway data and controls access to the roadway data according to the data price According to a further aspect, a non-transitory computer-readable storage medium including instructions that when executed by a processor, causes the processor to retrieve roadway data from connected vehicles according to a third party request and determine a roadway condition based on the roadway data. The processor calculates a data price based on the roadway condition and the roadway data and control access to the roadway data according to the data price.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
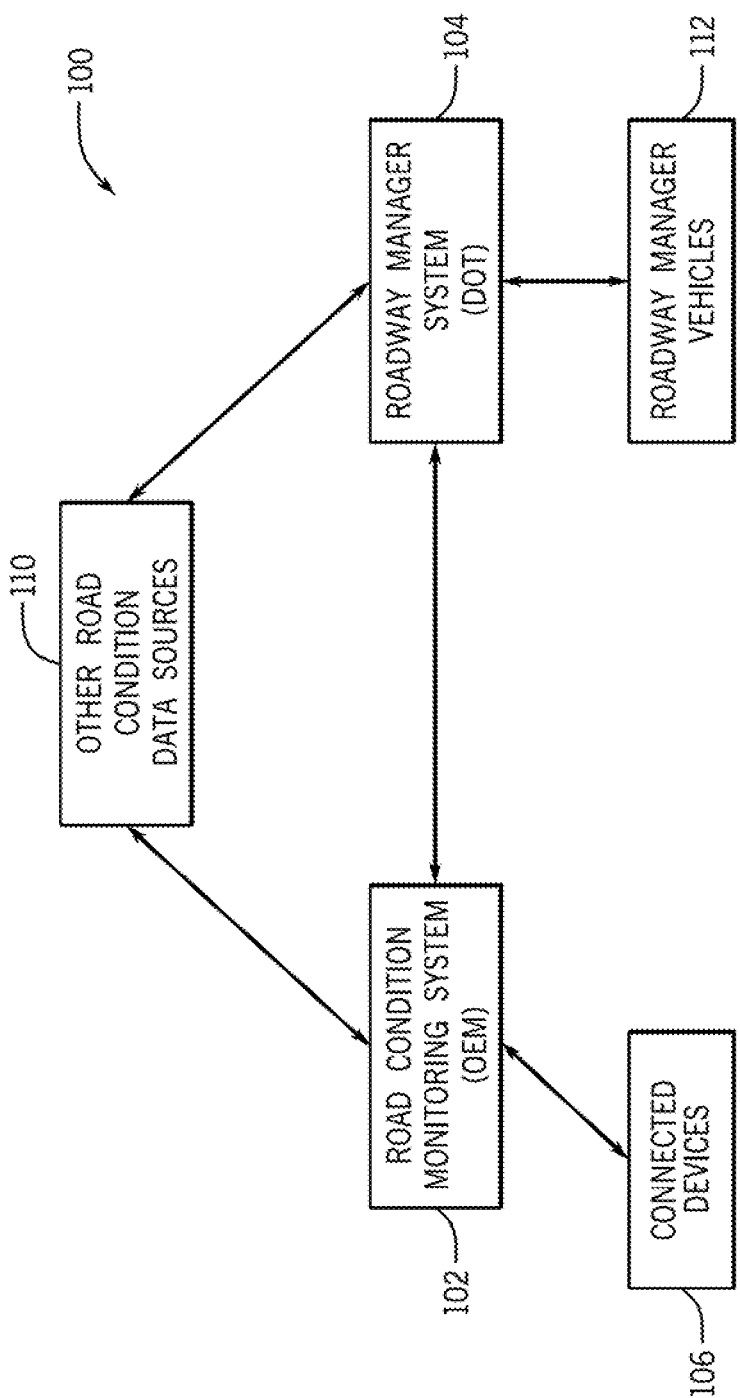
FIG. 1 is a block diagram of an exemplary dynamic roadway sensing system according to one embodiment.

The following includes definitions of selected terms employed herein. The definitions include various examples and/or forms of components that fall within the scope of a term and that can be used for implementation. The examples are not intended to be limiting. Further, the components discussed herein, can be combined, omitted or organized with other components or into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device, vehicle, vehicle computing device, infrastructure device, roadside device) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

"Disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR-RAM). The memory can store an operating system that controls or allocates resources of a computing device.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

"Vehicle control system" and/or "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

I. System Overview

The systems and methods discussed herein are generally directed to communicating and using real-time information from connected vehicles and connected devices for dynamic roadway sensing of various roadway conditions. More specifically, roadway data sensed from connected vehicles and connected devices can be aggregated and analyzed, for example facilitated by an original equipment manufacturer (OEM), and provided to roadway managers (e.g., city, state, and federal roadway managers) for real-time awareness of road conditions. Referring now to the drawings, wherein the showings are for purposes of illustrating one or more exemplary embodiments and not for purposes of limiting same, FIG. 1 is a high level block diagram of an exemplary dynamic roadway sensing system 100. The system includes a road condition monitoring system 102 that can be implemented, for example, by an OEM. The road condition monitoring system 102 can provide sensed roadway data (e.g., from connected devices 106), analysis of the roadway data, and other services to a roadway manager system 104. The roadway manager system 104 can be implemented by city, state, and/or federal roadway managers, for example, the Department of Transportation (DOT). As shown in FIG. 1, the roadway manager system 104 can be affiliated with and/or operably connected for computer communication with roadway manager vehicles 112 (e.g., city/state/federal vehicles, salt trucks, maintenance trucks, fleets of vehicles).

The road condition monitoring system 102 acquires data from connected devices 106. As used herein, the connected devices 106 can include vehicles, users, and/or infrastructure operatively connected for computer communication with the road condition monitoring system 102. For example, the devices 106 can include vehicles and users in an OEM network that are operably connected for computer communication as defined herein. The connected devices 106 can also include roadside devices, traffic infrastructures, and portable devices (e.g., associated with a vehicle occupant, pedestrian, other road users), among others, that are operably connected for computer communication as defined herein. As will be discussed, roadway data can be captured by the connected devices 106 using image sensors, vehicle sensors, among other types of sensors.

The roadway data sensed by the devices 106 can include any road condition data, road degradation data, traffic condition data, weather condition data, or vehicle condition data, among other types of data that describe a condition or a circumstance affecting a roadway. For example roadway data can include, but is not limited to, precipitation conditions, external lighting conditions, fog conditions, road construction, vehicle accidents, lane closures, lane markings, disabled vehicles, debris, portholes, flooding, high water, road kill, animals (alive or dead), road obstructions, stopped vehicles, traffic volume, power outages for traffic lights, icy or wet road conditions, and/or the like, and/or combinations thereof.

The roadway data collected by the road condition and monitoring system 102 can be aggregated, analyzed, and communicated to the roadway manager system 104. Additionally, the road condition and monitoring system 102 can utilize other road condition data sources 110. The other road condition data sources 110 can include but are not limited to data from road maps, towers, and/or gathered by the roadway manager system 104 (e.g., roadway speeds, temperature and wind, salt status, pavement wet/dry), GPS-AVL (Auto Vehicle Road Locator) data (e.g., data from cameras and sensors of roadway manager vehicles 112), weather subscription services data (e.g., forecast by location, pavement temperature, precipitation), manual entry data (e.g., data of events, incidents, road work, closures, delays), emergency notification system data, transit vehicle system schedules, among others.

Figure 2:
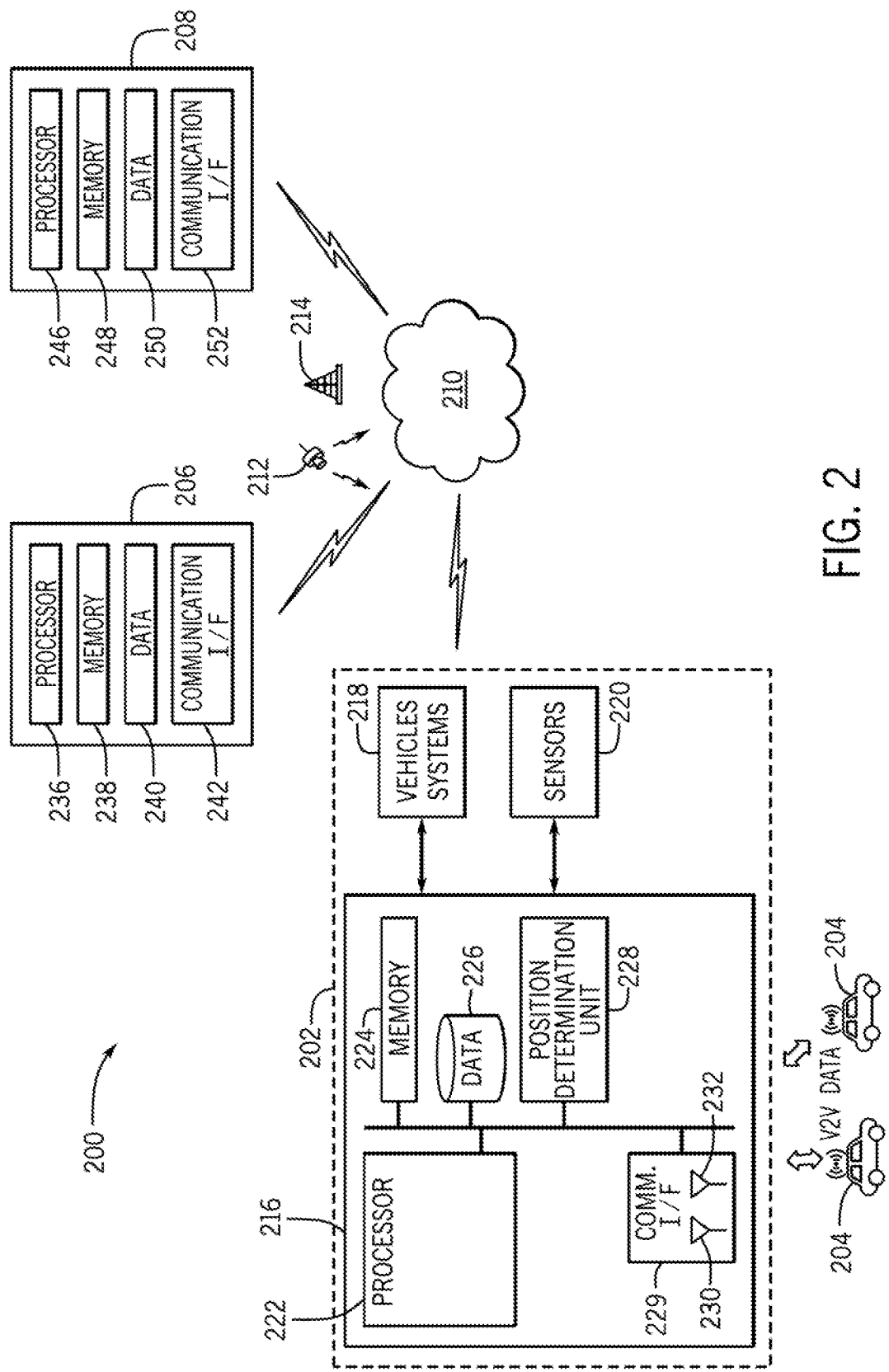
FIG. 2 is an exemplary operating environment according to one embodiment.

The components of the dynamic roadway sensing system 100 of FIG. 1 can be configured for computer communication. An exemplary configuration is shown in FIG. 2 within an operating environment 200. The operating environment 200 includes a connected vehicle 202 (e.g., the connected devices 106), other connected vehicles 204 (e.g., the connected devices 106), a road condition monitoring system server 206 (e.g., the road condition monitoring system 102), and a roadway manager system server 208 (e.g., the roadway manager system 104). Although not shown, other servers, connected devices, data stores and systems (e.g., other road condition data sources 110), and other vehicles (e.g., roadway manager vehicles 112) can include some or all of the computer components shown with respect to the components in FIG. 2. Thus, it is understood that the components of the operating environment 200, the connected vehicle 202, the other connected vehicles 204, the road condition monitoring system server 206, the roadway manager system server 208, and the as well as the components of other systems, hardware architectures, and software architectures discussed herein, can be combined, omitted, or organized into different architectures for various embodiments.

One or more of the components of the operating environment 200 can be considered in whole or in part a communication network or a vehicle communication network. For example, the vehicle 202 and the other vehicles 204 can communicate roadway data between one another using, for example, Dedicated Short Range Communications (DSRC). In another embodiment shown in FIG. 2, the vehicle 202 can communicate roadway data to the road condition monitoring system server 206, using, for example a communication network 210. In particular, the components shown in FIG. 2 can exchange data utilizing a satellite 212, a wireless network antenna 214, and/or the communication network 210 (e.g., a wireless communication network). However, it is understood that vehicle communication and/or data communication described herein can be implemented with any communication or network protocol, for example, ad hoc networks, wireless access within the vehicle, cellular networks, Wi-Fi networks (e.g., IEEE 802.11), Bluetooth, WAVE, CALM, among others. Further, the vehicle communication network can be vehicle-to-vehicle (V2V) or a vehicle-to-everything (V2X).

In FIG. 2, the vehicle 202 includes a vehicle computing device (VCD) 216, vehicle systems 218, and sensors 220. Generally, the VCD 216 includes a processor 222, a memory 224, a data store 226, a position determination unit 228, and a communication interface (I/F) 229, which are each operably connected for computer communication via a bus and/or other wired and wireless technologies defined herein. The VCD 216, can include provisions for processing, communicating and interacting with various components of the vehicle 202 and other components of the operating environment 200, including the other vehicles 204, the road condition monitoring system server 206, and the roadway manager system server 208.

The processor 222 can include logic circuitry with hardware, firmware, and software architecture frameworks. Thus, in some embodiments, the processor 222 can store application frameworks, kernels, libraries, drivers, application program interfaces, among others, to execute and control hardware and functions discussed herein. The position determination unit 228 can include hardware (e.g., sensors) and software to determine and/or acquire position data about the vehicle 202. For example, the position determination unit 228 can include a global positioning system (GPS) unit (e.g., the satellite 212) and/or an inertial measurement unit (IMU) (not shown). Thus, the position determination unit 228 can provide a geoposition of the vehicle 202 based on satellite data from, for example, a global position source, or from any Global Navigational Satellite infrastructure (GNSS), including GPS, Glonass (Russian) and/or Galileo (European).

The communication interface 229 can include software and hardware to facilitate data input and output between the components of the VCD 216 and other components of the operating environment 200. Specifically, the communication interface 229 can include network interface controllers (not shown) and other hardware and software that manages and/or monitors connections and controls bi-directional data transfer between the communication interface 229 and other components of the operating environment 200 using, for example, the other vehicles 204 and the communication network 210. More specifically, in one embodiment, the VCD 216 can exchange data and/or transmit messages with other compatible vehicles and/or devices via transceivers 230 and 232 or other communication hardware and protocols. Thus, the VCD 216 can exchange data (e.g., roadway data) with the other vehicles 204 using V2V communication (e.g., DSRC) as described herein.

Referring again to the vehicle 202, the vehicle systems 218 can include any type of vehicle control system and/or vehicle described herein to enhance the vehicle 202 and/or driving of the vehicle 202. For example, the vehicle systems 218 can include autonomous driving systems, driver-assist systems, adaptive cruise control systems, lane departure warning systems, merge assist systems, freeway merging, exiting, and lane-change systems, collision warning systems, integrated vehicle-based safety systems, and automatic guided vehicle systems, or any other advanced driving assistance systems (ADAS).

The sensors 220, which can be implemented with the vehicle systems 218, can include various types of sensors for use with the vehicle 202 and/or the vehicle systems 218 for detecting and/or sensing a parameter of the vehicle 202, the vehicle systems 218, and/or the environment surrounding the vehicle 202. For example, the sensors 220 can capture and provide roadway data as discussed herein. The sensors 220 can include, but are not limited to: acceleration sensors, speed sensors, braking sensors, proximity sensors, vision sensors, ranging sensors, seat sensors, seat-belt sensors, door sensors, environmental sensors, yaw rate sensors, steering sensors, GPS sensors, among others. It is also understood that the sensors 220 can be any type of sensor, for example, acoustic, electric, environmental, optical, imaging, light, pressure, force, thermal, temperature, proximity, among others. In the embodiments discussed herein, the sensors 220 can be used to capture roadway data.

As mentioned above, in some embodiments, data transmission can be executed at and/or with other infrastructures and servers. For example, in FIG. 2, the VCD 216 can transmit and receive information directly or indirectly to and from the road condition monitoring system server 206 over the communication network 210. The road condition monitoring system server 206 can include a processor 236, a memory 238, database 240, and a communication interface 242 that are configured to be in communication with one another. The road condition monitoring system server 206 can transmit and receive information directly or indirectly to and from the roadway manager system server 208 over the communication network 210. Similarly, the roadway manager system server 208 can include a processor 246, a memory 248, data 250, and a communication interface 252 that are configured to be in communication with one another.

Figure 3:
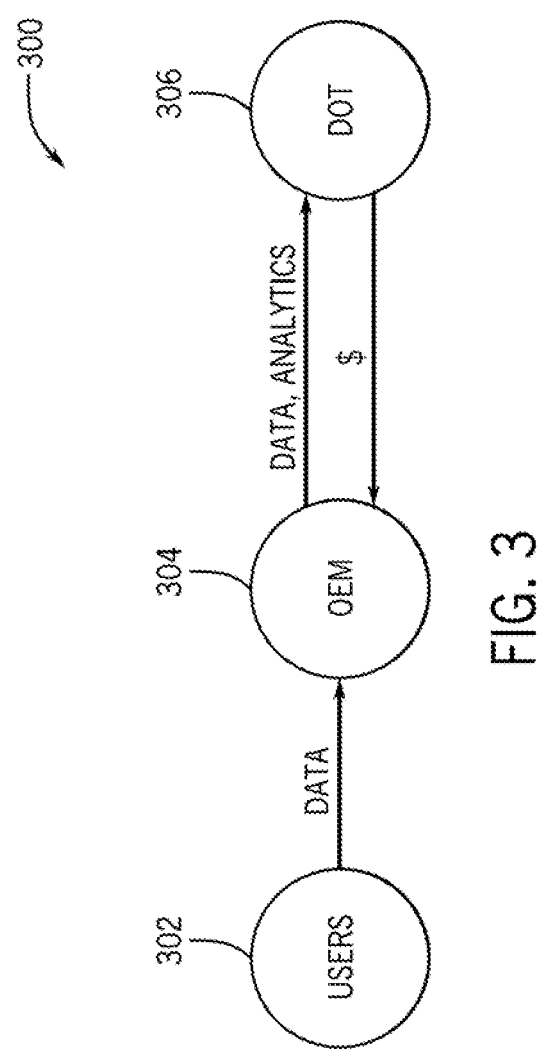
FIG. 3 is an exemplary data monetization model according to one embodiment.
Figure 4:
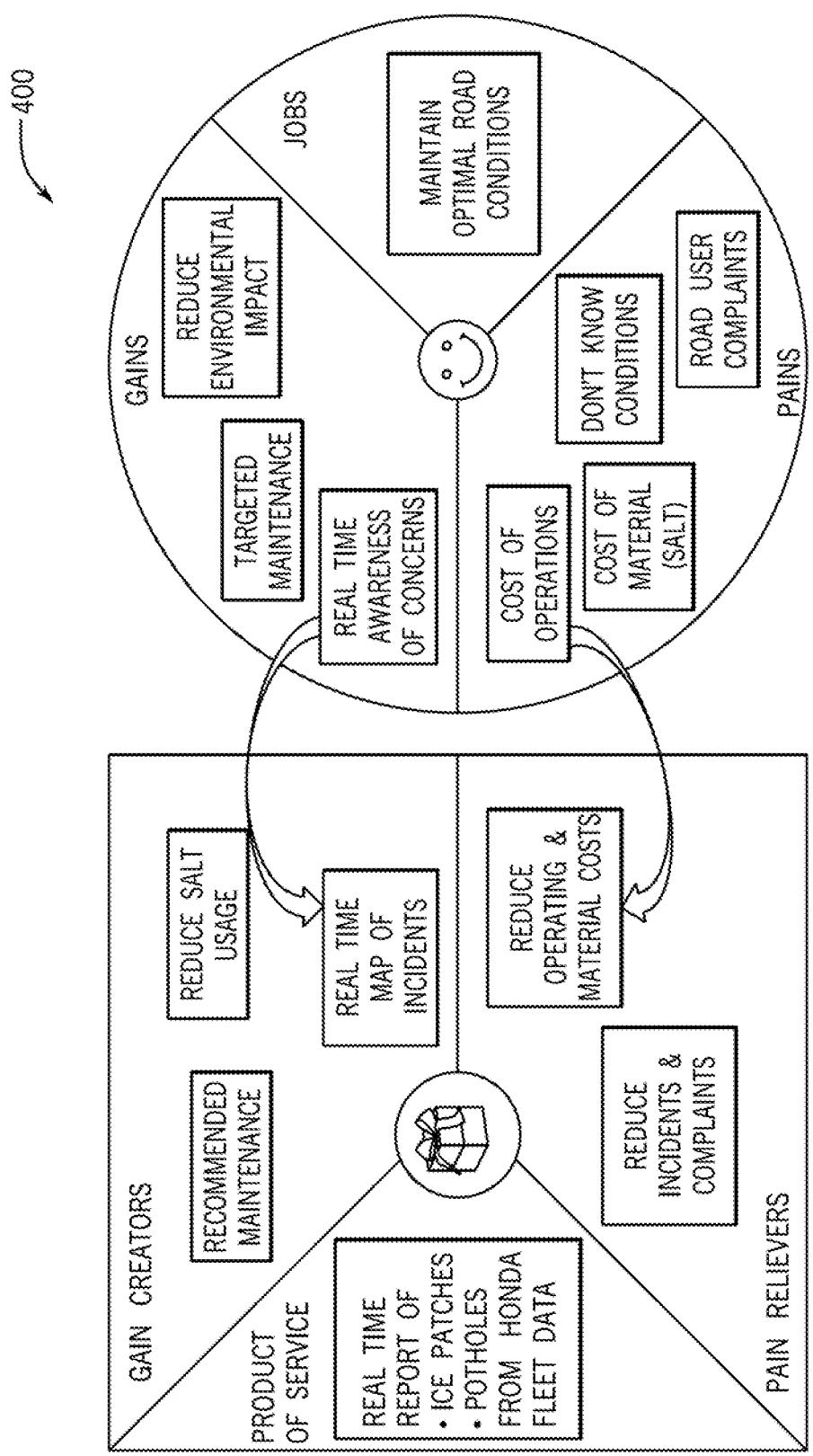
FIG. 4 is an exemplary value proposition diagram for a dynamic roadway sensing system.

The roadway data aggregated by the road condition monitoring system server 206, and data analysis, insights and services using the roadway data can be monetized and provided to, for example, the roadway manager system server 208 (e.g., DOT). An exemplary business model 300 executed by the systems and components described herein is shown in FIG. 3. Roadway data from the users 302 (e.g., users and/or vehicles associated with an OEM) is communicated to the road condition monitoring system 304 (e.g., the OEM) as discussed above with FIGS. 1 and 2. The road condition monitoring system 304 can sell the roadway data, analytics, insights, and other services based on the roadway data to a roadway system manager 306 (e.g., DOT). The dynamic roadway sensing discussed herein can provide several value propositions for the roadway system manager 306 as shown in the value proposition diagram 400 of FIG. 4.

II. Methods for Dynamic Roadway Sensing

Exemplary methods and use case scenarios for dynamic roadway sensing will now be described in detail. It is understood that the exemplary methods and applications discussed herein can be implemented with one or more components described above with FIGS. 1-4. Dynamic roadway sensing for condition monitoring can be utilized to implement counteractive measures as well as provide design, construction, and maintenance of physical and natural environments. Further, dynamic roadway sensing can be utilized for data brokerage, dynamic data access, and pricing.

A. Condition Monitoring

Figure 7:
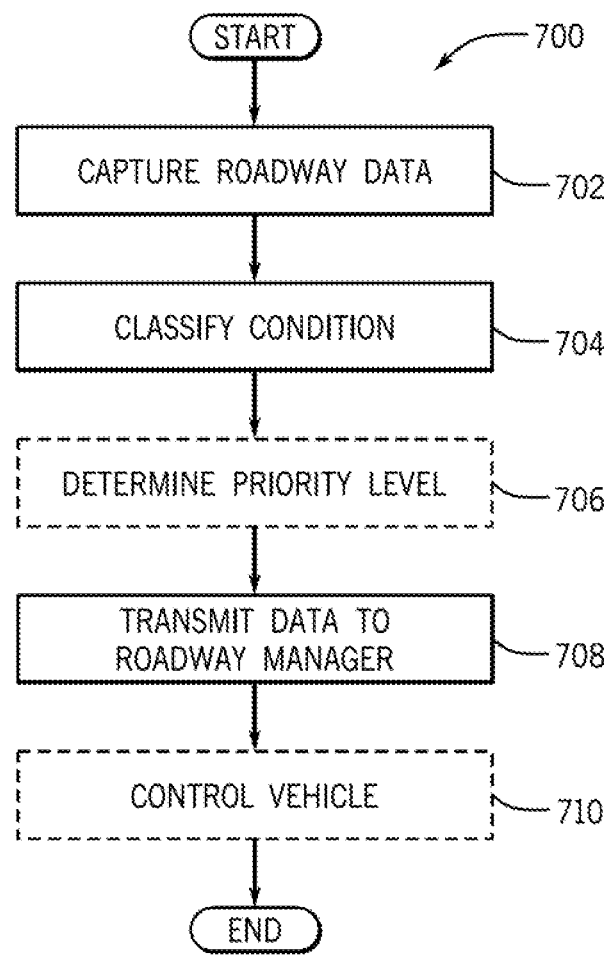
FIG. 7 is a process flow diagram of a method for roadway condition monitoring according to one embodiment.

Referring now to FIG. 7 a method 700 for condition monitoring is shown according to one embodiment. At block 702, the method 700 includes capturing roadway data. For example, the roadway data can be captured by the connected vehicle 202 using the vehicle systems 218 and/or the sensors 220. In other embodiments, roadway data can be captured by other connected vehicles 204, connected infrastructures/devices, and/or accessed from the other road condition data sources 110.

At block 704, the method 700 includes classifying a condition based on the roadway data. In the embodiments discussed herein, a condition based on the roadway data can be referred to as a roadway condition and/or a weather condition. For example, using the roadway data any weather conditions and/or road conditions into, for example various levels. The term "level" as used throughout this detailed description and in the claims refers to any numerical or other kind of value for distinguishing between two or more conditions or states (e.g., roadway conditions, weather conditions, driving conditions). For example, with respect to visibility conditions, in some cases, the level of visibility can be given as a percentage between 0% and 100%, where 0% refers to visibility conditions that are totally clear (e.g., sunny) and/or totally unobstructed and 100% refers to visibility conditions that are fully opaque (e.g., dark) and/or fully obstructed. In other cases, the level of visibility could be a value in the range between 1 and 10. For example, level 1 can be sunny and level 10 can be extremely snowy. As another example, level 1 is high visibility and level 10 is no visibility.

In still other cases, the level of visibility is not a numerical value, but could be associated with a given discrete state, such as "no visibility," "low visibility," "fair visibility," "good visibility" and "high visibility." Moreover, the level of visibility could be a discrete value or a continuous value. In some cases, the level of visibility can be associated with a standard measurement and/or classification system defined by the roadway manager. For example, the roadway manager system 104 can define weather condition emergency level definitions (e.g., level 1 snow emergency, level 2 snow emergency, and so on). Thus, the level of visibility can also be a category used to identify a classification or any other means of grouping or segregating weather and/or road conditions. Although level of visibility is used here as an example, it is understood that the level can describe any condition or state.

At block 706, the method 700 includes determining a priority level. In some embodiments, the classification and the roadway data can be used to determine a priority level (e.g., to be used by the roadway manager for maintenance). In some embodiments, the priority level indicates a level of severity and/or a level of urgency. As an illustrative example, a stop sign (e.g., a regulatory sign) that is partially obstructed can have a higher maintenance priority level as compared to a point of interest sign (e.g., a guide sign) that is partially obstructed.

At block 708, the method 700 includes transmitting the data to the roadway manager system 104. The data can include the roadway data, the condition, and/or the priority level along with other data related to the location, condition, priority level, etc. In some embodiments, the data includes data aggregated and/or analyzed by the road condition monitoring system 102.

In addition to transmitting the data at block 708, countermeasures to the conditions can be controlled and implemented. For example, at block 710, the method 700 includes controlling a vehicle. For example, the roadway manager system 104 can control and deploy roadway manager vehicles 112 based on the roadway data, condition, and/or priority level. In some embodiments, a parameter of the roadway manager vehicle 112 can be controlled, for example, a salt distribution mechanism. It is understood that any type of device and/or system can be controlled based on the roadway data, the condition, and/or the priority level.

Exemplary use cases for condition monitoring that can be utilized with the method 700 shown in FIG. 7 will now be discussed. As mentioned herein, some roadway managers manually monitor snow accumulation on roads or receive weather reports/public reports on levels of snow. Based on this information, the roadway managers take counteractive measures including the usage of salt and liquid deicers to de-ice the roads. In some cases this strategy is not cost efficient due to manual labor. Also, sometimes, the counteractive measures are delayed and lead to crashes since the roadway managers manual monitoring is time consuming. Further, the counteractive measures are expensive due to non-optimal procedures.

Figure 5:
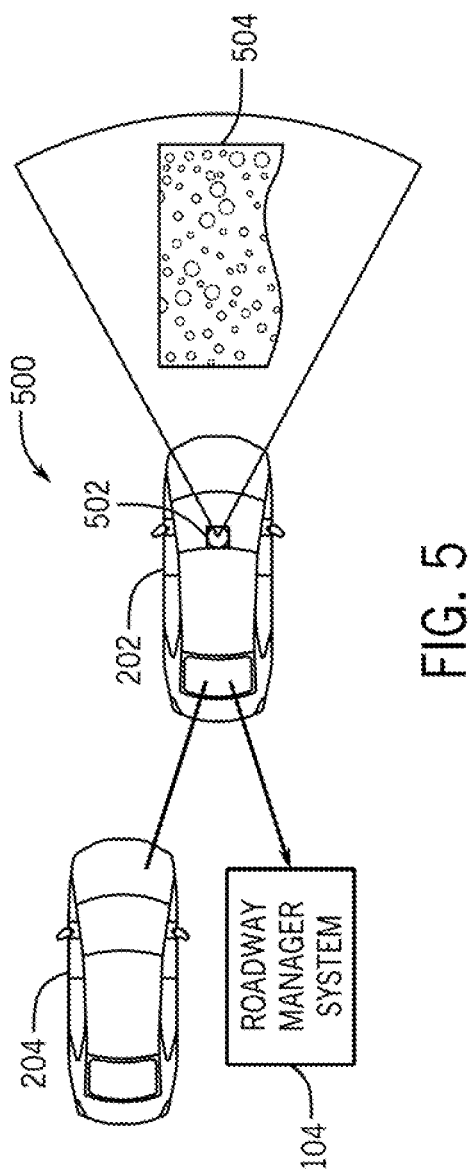
FIG. 5 is an exemplary visibility condition monitoring system according to one embodiment.

Referring now to FIG. 5, a visibility condition monitoring system 500 is shown with the connected vehicle 202 communicating roadway data to the other connected vehicles 204 and the roadway manager system 104. In this example, the roadway data captured by the connected vehicle 202 can include image data from vehicle systems 218 and/or sensors 220. For example, in FIG. 5, the connected vehicle 202 includes a camera 502 that captures images ahead of the connected vehicle 202. In this example, roadway data 504 includes image data of the roadway conditions and/or weather conditions surrounding the connected vehicle 202, specifically, images of snowfall.

As discussed above with FIGS. 1 and 2, connected vehicles and/or infrastructures are equipped with DSRC communication, telematics, and image sensors. The visibility condition monitoring system 500 can classify (e.g., using image recognition techniques) the roadway conditions and/or the weather conditions (e.g., based on the image data) into various levels of visibility. For example, as discussed above in detail with FIG. 7, levels can range from 1 to 7 in which level 1 can be sunny and level 7 can be extremely snowy. As another example, levels can range from 1 to 7 in which level 1 is high visibility and level 7 is no visibility.

Once the visibility condition level is classified, it is transmitted to the roadway manager system 104 (e.g., at block 708) with the latitude and longitude information of the snowfall area. If the level is maximum, the roadway manager system 104 can respond to the highly prioritized extreme snowfall prone area with its counteractive measures without any delay. Thus, roadway data can be used to help salt truck routing.

With respect to the visibility and snowfall example of FIG. 5, visibility can be a measure of the distance at which an object or light can be clearly discerned. For example, based on the image data acquired, a visibility distance from a particular perspective of the connected vehicle 202 or from the connected vehicle 202 to a particular point can be determined. The visibility condition monitoring system 500 can compare the visibility distance to a predefined threshold to determine the level and/or category of the weather condition and/or road condition (e.g., at block 704). As an illustrative example, if the visibility distance is less than 273 meters, the road condition is classified as fair visibility, whereas if the visibility distance is less than 85 meters, the road condition is classified as poor visibility. As another example, if the visibility distance is less than 273 meters, the weather condition is classified as fog, whereas if the visibility distance is less than 85 meters, the weather condition is classified as dense fog. It is understood that other predefined thresholds can be utilized and in some embodiments, the predefined thresholds can be obtained and/or defined by the roadway manager system 104.

Another type of road condition monitoring will now be described with FIG. 6. Signage (e.g., regulatory signs, warning signs, and guidance signs) can be damaged by human factors or natural factors. For example, signage can fall off because of extreme weather conditions (e.g., wind, thunderstorms, and tornadoes), signage can have misleading phrases, or can be unrecognizable due to weather or human factors (e.g., vandalism). Signage is very important for road users to understand the environment of the driver. Thus, identification and replacement of signage is important. Currently, some roadway managers are manually inspecting the legibility of signage on roadways. Manual monitoring can be dangerous for road users due to delayed replacement. It is also expensive since manual labor is involved for monitoring.

Figure 6:
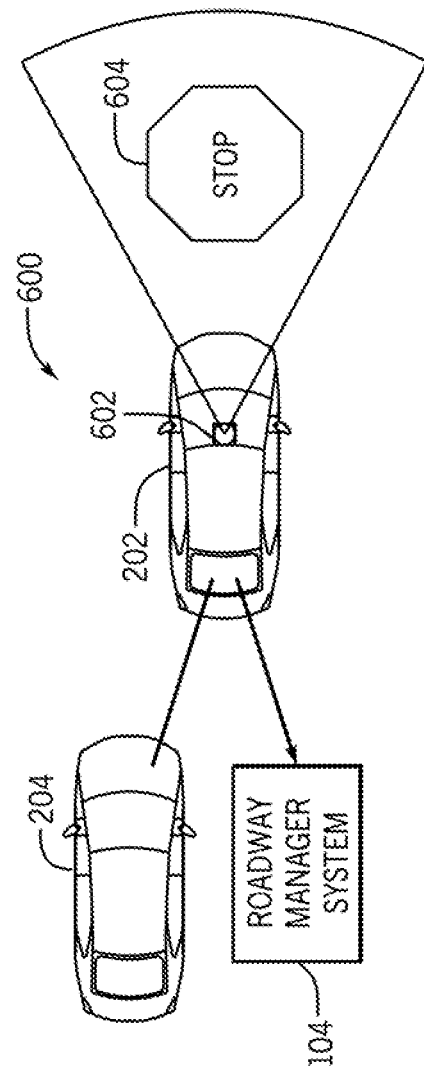
FIG. 6 is an exemplary signage condition monitoring system according to an exemplary embodiment.

Accordingly, in FIG. 6, a signage condition monitoring system 600 according to an exemplary embodiment is shown including the connected vehicle 202 communicating roadway data to the other connected vehicles 204 and the roadway manager system 104. The roadway data can include image data from vehicle systems 218 and/or sensors 220. For example, in FIG. 6, the connected vehicle 202 includes a camera 602 that captures images (e.g., at block 702) ahead of the connected vehicle 202. In this example, roadway data 604 includes image data of an area surrounding the connected vehicle 202 including images of signage. In some embodiments, to implement the system 600, the roadway manager system 104 provides ground truth signage report and traffic signal classification (e.g., other road condition data sources 110). Thus, image recognition can be used on image data for traffic signal and/or sign classification and to determine whether signage is damaged, obstructed, or missing. Using connected cars to perform the signage monitoring can improve signage issues by reporting the missing, obstructed, or damaged sign to the roadway manager system 104 and nearby drivers (e.g., the other connected vehicles 204).

For example, in one embodiment, the signage condition monitoring system 600 can compare the image data (e.g., roadway data 604) to a map database and/or a database hosted by the roadway manager system 104 to determine a sign classification and/or a condition of the sign (e.g., a block 704). A sign classification can include, for example, a regulatory sign (e.g., giving notice of traffic laws or regulations), a warning sign (e.g., giving notice of a situation that is not readily apparent), and/or a guide sign (e.g., showing route designations, destinations, directions, distances, services, points of interest). The condition of the sign can also be determined based on the image data (e.g., the roadway data 604) to a map database and/or a database hosted by the roadway manager system 104 and/or the sign classification. For example, a stop sign that is partially covered by graffiti can be classified as slightly damaged.

In another example, the classification can be a level of visibility and/or obstruction of the sign. For example, a stop sign that is covered by a tree branch can be classified as partially obstructed or 53% obstructed, for example. The visibility level along with the classification of the sign can also be used to determine priority levels (e.g., to be used by the roadway manager for maintenance). For example, a stop sign (e.g., a regulatory sign) that is partially obstructed can have a higher maintenance priority level as compared to a point of interest sign (e.g., a guide sign) that is partially obstructed.

In another embodiment, signage monitoring can include monitoring temporary signs that indicate a particular roadway condition and controlling removal of said signs when the roadway condition is resolved. As an illustrative example, a roadway manager system 104 can position a sign indicating high-water at a particular location. The signage condition monitoring system 600 can monitor the high-water (e.g., capture roadway data) and determine when the sign can be removed (e.g., when the water falls below a predetermined threshold). Accordingly, the roadway manager system 104 can dispatch the roadway manager vehicles 112 to remove the sign (e.g., at block 710).

Signage monitoring is one example of road degradation monitoring and overall road maintenance planning that can be provided by the dynamic roadway sensing system described herein. Other roadway data indicative of road degradation (e.g., pot holes, lane markings) can be provided to roadway managers thus freeing the roadway managers 104 from conducting road surveys. Furthermore, roadway managers can dispatch roadway manager vehicles and workers to areas where maintenance is required based on the roadway data (e.g., at block 710). As an example, using image recognition and/or traffic data, the dynamic roadway sensing system described herein can identify road areas that are obstructed, for example, by high water, animals (alive or dead), stopped vehicles, and other obstructions. Based on the information provided by dynamic roadway sensing system described herein, the roadway manager system 104 can dispatch roadway manager vehicles 112 and workers to remove the obstruction faster than they would be able to with the manual reporting techniques described. In some embodiments, the roadway data can be used to provide a severity/priority level of the obstruction (e.g., at block 706). Exemplary embodiments of other types of road degradation monitoring and road maintenance planning will now be discussed.

According to one example, the road condition monitoring system 102 can detect, monitor, and control maintenance of potholes. Currently, some roadway managers are manually inspecting roadways for potholes and/or relying on road users to report potholes. Using roadway data, the road condition monitoring system can detect potholes, classify potholes, and control maintenance of potholes and/or report potholes to the roadway manager. For example, based on image data, measurements and/or specifications of the pothole (e.g., depth, diameter, shape, and geometry) can be determined and used to classify the pothole (e.g., at block 704). In other embodiments, other types of roadway data, for example, data from the vehicle sensors (e.g., CAN data, wheel speed sensors, tire pressure sensors), can also be used to classify the pothole. As one example, the measurements and/or specifications of a pothole can be used to classify the pothole as small, medium, or large.

As mentioned above, in some embodiments, the roadway data can be used to provide a severity/priority level of the pothole (e.g., at block 706). For example, a large pothole can have a higher priority for maintenance as compared to a medium pothole. As another example, if the roadway data indicates the medium pothole is located on a high traffic roadway, the medium pothole may have a higher priority level than the large pothole.

The classification and/or level of the pothole can be used to control maintenance of potholes and/or report potholes to the roadway manager (e.g., at block 708 and 710). For example, the classification and/or level of the pothole can be communication to the roadway manager system 104 using for example, the communication network 210. In some embodiments, using the communication network 210, the classification and/or level of the pothole can be updated automatically by the road condition monitoring system 102. In some embodiments, the road condition monitoring system 102 can initiate and/or modify a maintenance system to control repair of the pothole. For example, a repair classification can be updated. A repair classification can indicate a time period of repair. For example, an urgent repair is less than 1 day, a short term repair is less than 1 month, a medium term repair is between 2-6 months, and a long term repair is more than 6 months. As an illustrative example, a particular road segment may have a repair classification of long term. However, based on roadway data indicating a sudden change in the roadway (e.g., a large pothole) or a severe weather event, the repair classification can be modified to short term.

According to another example, the road condition monitoring system 102 can detect, monitor, and control maintenance of lane lines. Currently, some roadway managers are manually inspecting roadways for lane line degradation and/or relying on road users to report traffic flow issues that can be caused by lane line degradation. Using roadway data, the road condition monitoring system can monitor lane lines, classify the lane lines, the severity of degradation and/or the level of visibility, and report the classifications to a roadway manager and/or control maintenance of lane lines, road maintenance, and/or roadway design. For example, image data of the lane lines (e.g., roadway data) can be compared to baseline data about the roadway and/or lane lines. Thus, the road condition monitoring system 102 can determine whether there is a discrepancy between the current image data of the lane lines and the baseline data (e.g., what is there vs. what should be there with respect to lane lines).

As an illustrative example, the roadway data can indicate that a single yellow line is present on a roadway while stored map data can indicate that a double yellow line should be present on said roadway. This discrepancy is identified by the road condition monitoring system and used to classify the lane line degradation, for example, by a measurement of visibility of the lane line. The measurement of visibility can be due to weather conditions and/or roadway conditions. For example, current weather can affect visibility of the lane lines, obstructing road debris can affect visibility of the lane lines, and road degradation can affect visibility of the lane lines. In another embodiment, a roadway can be classified according to a road type of new or old based on the visibility of the lane lines on that roadway.

The classification and/or level of the lane lines can be used to control maintenance of the roads/lane lines and/or report the lane line conditions to the roadway manager. For example, the classification and/or level of the lane lines can be communicated to the roadway manager system 104 using for example, the communication network 210. In some embodiments, using the communication network 210, the classification of the lane lines and/or level of severity/visibility can be updated automatically by the road condition monitoring system 102. In some embodiments, the road condition monitoring system 102 can initiate and/or modify a maintenance system to control repair or maintenance of the road and/or the lane lines.

The road condition monitoring system 102 can also utilize the roadway data to identify high water conditions. For example, based on the roadway data and predetermined threshold levels, the road condition monitoring system can determine if a low or a high level of water exists on the road. A priority level as discussed above can also be assigned to the roadway based on the water level. For example, if a high water level exists on a roadway, a priority level of 1 can be assigned to the roadway and maintenance can be dispatched to the roadway to address the high water according to the priority level.

In another embodiment, the road condition monitoring system 102 can determine whether a road condition is a drivable object or non-drivable object. For example, if the road conation monitoring system 102 determines a road condition is obstructing the roadway, the road condition monitoring system 102 can determine whether a vehicle (e.g., the connected vehicle 202) can drive over or drive through the road condition. Drivable objects can include, but are not limited to, debris of a smaller size, small roadkill, and objects having a size smaller than a predefined threshold with respect to the size of the connected vehicle 202. Non-drivable objects can include, but are not limited to, debris of a large size, fallen trees, large roadkill (e.g., a deer), blown-out tires, and objects having a size larger than a predefined threshold with respect to the size of the connected vehicle 202.

The road condition monitoring system 102 can also utilize the roadway data to determine and provide road design feedback. Thus, the road condition monitoring system described herein can provide insight and recommendations for current and/or future geometric design features, traffic designs, speed designs, bicycle and pedestrian designs, among others. Roadway data about a particular design or roadway that can be used for road design feedback includes, but is not limited to, stability control, steering input, latitude, longitude, location, timing, and frequency. Roadway data about evasive maneuvers or initiation of ADAS systems for a particular location can also be utilized. Further, in some embodiments, the road condition monitoring system can use the roadway data to identify vehicle driving patterns and analyze the driving patterns to identify poorly designed road geometry. The road condition monitoring system can suggest areas for redesign or specific design changes based on the vehicle driving patterns.

As mentioned above, the roadway data, classifications and/or priority levels can be communicated to the roadway manager system server 208 and/or this information can be automatically updated. The communication and/or update timing can be on-demand, periodic, contingent or particular criteria, and/or any combination of the aforementioned. For example, if the roadway manager system 104 is interested in a particular road segment due to weather conditions and/or roadway conditions, the road condition monitoring system 102 can receive, determine and transmit information about the road segment on-demand. In another embodiment, the information can be transmitted at a predetermined time period, for example, once a week, once a month.

In other embodiments, the information can be transmitted based on the roadway data and/or other detected conditions and levels. For example, based on a particular weather condition, roadway condition, visibility condition, and other predefined trigger conditions. As an illustrative example, the road condition monitoring system 102 can transmit information about a road segment upon detecting a severe pothole, a medium snowfall, and low visibility. In another embodiment, the road condition monitoring system 102 can monitor for sudden relative change based on time, weather conditions, roadway conditions, and debris as compared to absolute change over the time. As an illustrative example, pavement degradation over two years. This allows roadway managers to manage roadways proactively.

As mentioned above, salt truck routing and distribution can be controlled based on the roadway data and classification/levels determined by the road condition monitoring system 102. In one embodiment, the salt truck (e.g., a roadway manager vehicle) can be controlled to distribute salt, distribute deicing fluid, and/or plow the roadway according to the roadway data and classification/levels determined by the road condition monitoring system. For example, the roadway control monitoring system can control a salt spreader operatively connected for computer communication to the roadway manager vehicle, by adjusting and/or setting feed flow gate settings, hopper settings, speed, type of road salt to be distributed, or another calibration or setting of the salt spreader. As an illustrative example, if the road condition monitoring system 102 determines the amount of snow exceeds a predetermined threshold, the road condition monitoring system can increase the rate in which the salt spreader distributes the salt.

Further, the roadway manager system 104 can control a snow plow operatively connected for computer communication to the roadway manager vehicles 112, by adjusting and/or setting a position of the plow, snow blades, or another calibration or setting of the snow plow. As an illustrative example, the roadway manager system 104 can adjust a height of the snow blade based on a level of snow determined by the road condition monitoring system 102. Additionally, route control of the roadway manager vehicles 112 can be implemented by the road condition monitoring system 102. It is also appreciated that the road condition monitoring system 102 can control the route, the salt spreader, and the plow in conjunction to optimize road maintenance. It is further appreciated that control can be executed with more than one roadway manager vehicles 112, for example, a fleet of salt trucks can be controlled (e.g., number of salt trucks on the roadways, routing of each vehicle in the fleet).

In a further embodiment, the roadway condition monitoring system 102 can utilize roadway data to determine and provide road maintenance feedback. This allows the roadway condition monitoring system 102 to evaluate the performance of the roadway manager vehicles 112 and provide feedback. For example, the roadway condition monitoring system 102 can receive roadway data associated with a time and a location of a route after the roadway manager vehicles 112 have provided maintenance (e.g., salt distribution, snow plowing). The roadway data can be analyzed and/or aggregated to evaluate the performance of the roadway manager vehicles 112 and provide feedback to the roadway manager system 104. For example, the feedback can be about the amount and/or rate of salt distributed with respect to the roadway condition identified.

In another embodiment, autonomous vehicle control of connected vehicles on the roadway can be executed based on the roadway data and the road condition monitoring system. Settings of an autonomous vehicle and/or an ADAS can be controlled. For example, the system can adjust driver handover time with earlier warnings to upcoming driving environment changes, such as a hand-over time for a change lane detection to be more or less sensitive. As an illustrative example, a change lane detection contrast setting of a lane detection system can be modified based on a level of visibility of lane markings. Typically, if blurry lane lines are detected, the lane detection system may turn off detection output. However, the system does not have to turn off lane detection if the connected vehicle determines an upcoming road segment has blurry lane markings (e.g., 75% visibility), which increases the lane detection system confidence. It is understood that similar methods applied to autonomous vehicle control and ADAS can be applied, for example, with signage condition monitoring and other road condition monitoring.

B. Dynamic Data Pricing and Access

As mentioned above with FIGS. 3 and 4, several value propositions and systems can be implemented utilizing the road condition monitoring system 102 described herein. In one embodiment, automated data market control can be implemented. For example, the road condition monitoring system 102 can distribute and/or communicate roadway data or transformed roadway data based on a subscription model. The roadway manager system 104 and/or other third-party systems can interface with the road condition monitoring system 102 according to a subscription that allows a particular type of access to the roadway data and/or information derived from the roadway data. For example, the road condition monitoring system 102 can provide access to particular roadway data and/or transformed roadway data periodically or on-demand. Pricing can be adjusted according to the type of data, amount of data, a flat rate and/or pay as you go.

In another embodiment, roadway data and/or transformed roadway data can be classified into one or more tiers and provided to third-parties according to a subscription level that is associated with the tiers. Additionally, pricing of the data can be determined according to the tiers. In one embodiment, pricing varies as a function of data granularity and/or data type. For example, raw roadway data (e.g., sensor data that has not been transformed) can be associated with a lower price than transformed roadway data. As another example, roadway data in an image format can be associated with a higher price than roadway data in a text format.

Figure 8:
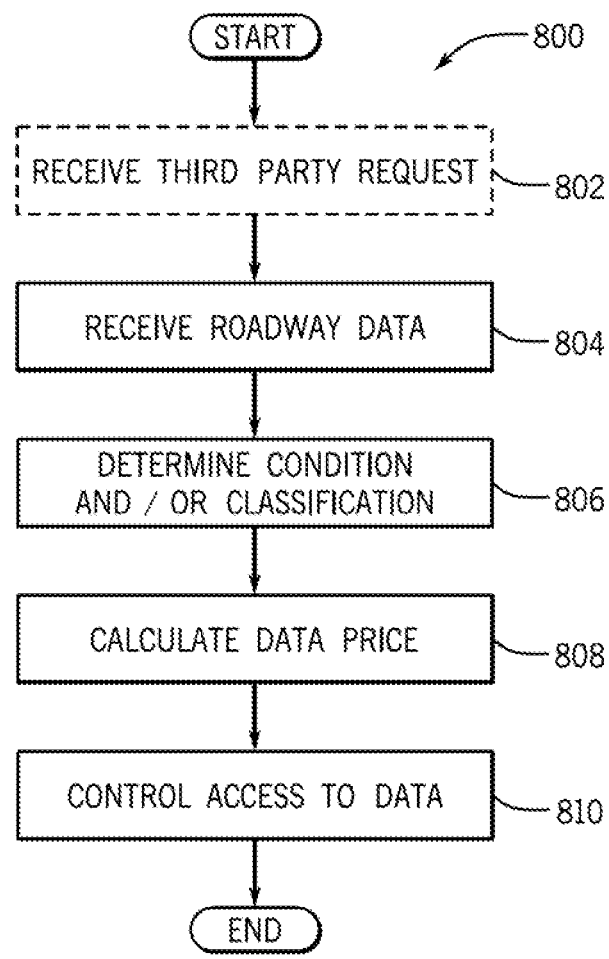
FIG. 8 is a process flow diagram of a method for dynamic data pricing and access according to one embodiment.

In one embodiment, the road condition monitoring system 102 can implement real time pricing, purchasing, and auctioning of roadway data and/or classification data. For example, the road condition monitoring system 102 can dynamically adjust pricing of roadway data and/or transformed roadway data. Referring now to FIG. 8, a method 800 for dynamic data pricing and access is shown according to one embodiment. At block 802, the method 800 includes receiving a third party request for data and/or pricing. For example, the road condition monitoring system 102 can receive a data query or a price query from one or more third parties (e.g., the roadway manager system 104). In some embodiments, the third party request includes one or more parameters defining characteristics of the data desired by the third party. For example, a location parameter associated with the data (e.g., latitude and longitude), a temporal parameter associated with the data (e.g., day, time of day), a road segment parameter, a type of data parameter (e.g., image, text), a weather condition (e.g., snow, rain), a roadway condition (e.g., an obstruction, slick roadway), a traffic condition (e.g., an accident), among others. In another embodiment, the third party request can include a data finder incentive for finding and providing specific types of data and/or conditions. The data finder incentive can based in any type of currency or reward, for example, monetary currency (e.g., dollar, euro), bitcoin, crypto currency, stocks, bonds, discounts, non-monetary goods, among others. Accordingly, the roadway manager system 104 can offer an incentive to the road condition monitoring system 102 and/or the connected devices 106 for finding and/or providing data and/or conditions of interest to the roadway manager system 104.

At block 804, the method 800 includes receiving roadway data from the connected devices 106 according to the third party request. As discussed above in detail with FIG. 7 and block 702, the road condition monitoring system server 206 can receive roadway data from the connected vehicle 202 and the other connected vehicles 204. For example, the connected vehicle 202 can capture roadway data using the vehicle systems 218 and/or the sensors 220. The roadway data received is in alignment with the parameters of the third party request, for example, roadway data associated with a location defined in the third party request. Other parameters of the third party request can also include, but are not limited to, a temporal parameter associated with the data (e.g., day, time of day), a road segment parameter, a type of data parameter (e.g., image, text), a weather condition (e.g., snow, rain), a roadway condition (e.g., an obstruction, slick roadway), a traffic condition (e.g., an accident), among others. Accordingly, the roadway data can be selectively received and/or obtained from one or more of the connected devices 106 in real time based on the third party request. It is understood that in some embodiments, the road condition monitoring system server 206 can receive and/or retrieve the roadway data from the connected devices 106 that are not vehicles, for example, connected infrastructure.

Referring again to FIG. 8, at block 806, the method 800 includes determining a condition and/or a classification based on the roadway data. For example, as discussed above in detail with block 704 in FIG. 7, the road condition monitoring system 102 can determine one or more roadway conditions, weather conditions, or driving conditions based on the roadway data. Thus, in one embodiment, the road condition monitoring system 102 determines a roadway condition and/or a weather condition based on the roadway data. At block 808 the method 800 includes calculating a price for the roadway data. For example, the road condition monitoring system 102 can calculate a price for the data based on the roadway data, the one or more roadway conditions, weather conditions, or driving conditions. The prices can be calculated based on a baseline pricing model (e.g., stored at the database 240). Additionally, the price for the data can be based on one or more parameters of the third party request. For example, the price for the roadway data can be based on one or more of the following, time (e.g., time of day, time of the request), demand for data (e.g., number of third parties requesting the data at a particular time), data granularity, type of data, data source, data aggregation (e.g., data packages), location associated with the roadway data, condition associated with the roadway and/or the third party request, among others. It is understood that the price for the data can be any type of currency, for example, monetary currency (e.g., dollar, euro), bitcoin, crypto currency, stocks, bonds, discounts, non-monetary goods, among others.

As an illustrative example, snowfall level data can be priced at $1.00 if requested (e.g., at block 802) during a level 1 snow emergency. However, if snowfall levels are requested during a level 2 snow emergency and during an evening hour (e.g., time of day), the road condition monitoring system calculates a dynamic price based on these factors, for example, the snowfall level data is calculated to be $5.00. It is understood that various types of pricing models can be used to calculate the dynamic pricing of data. Referring again to the illustrative example, if more than one third party requests said data during the level 2 snow emergency and during the evening hour, the road condition monitoring system calculates a dynamic price the snow fall level data can be based on the number of third parties (e.g., demand). In another embodiment, the price for the roadway data can be based on the data source of the roadway data. For example, the specific connected vehicle and/or sensor that is used to capture the roadway data. In some embodiments, roadway data from data sources that have higher quality data capture capabilities may have a higher data price than roadway data from data sources that have low quality data capture capabilities.

Referring again to FIG. 8, the method 800 includes controlling access to the roadway data. For example, the road condition monitoring system 102 can control communication and/or transmission of the roadway data based on the data price and the third party. In one embodiment, controlling access to the data includes executing a data transaction according to the data price. Thus, the road condition monitoring system 102 is capable of executing settlement negotiations and transactions.

Figure 9:
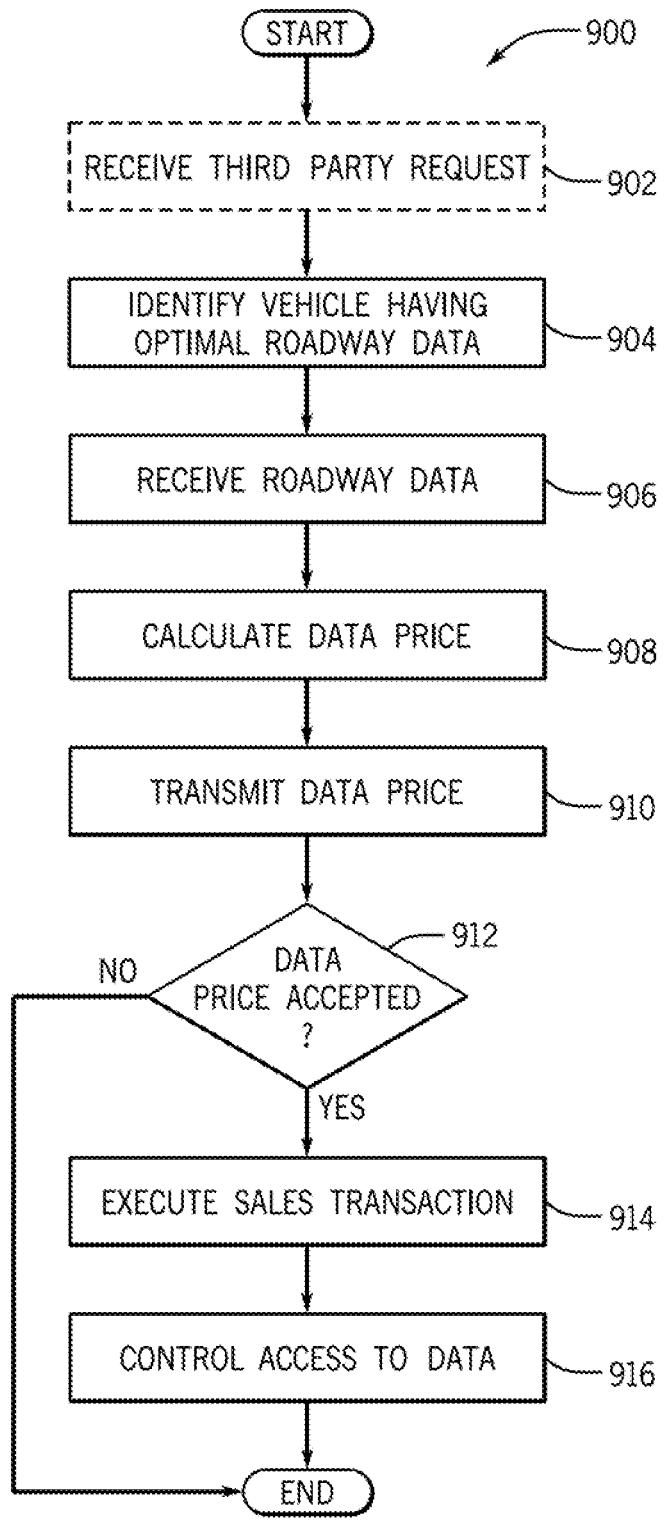
FIG. 9 is a process flow diagram of a method for dynamic data pricing and access according to another embodiment.

In another exemplary embodiment, the road condition monitoring system can act as a crowdsourcing moderator between the connected devices 106 (e.g., OEM users) and other third party systems. For example, the road condition monitoring system 102 can calculate the price of roadway data that is sourced from a particular connected vehicle (e.g., data source of the roadway data). The road condition monitoring system 102 can then facilitate the sale and access of data between the connected vehicle and the third party. Referring now to FIG. 9 a method 900 for dynamic data pricing and access according to another exemplary embodiment is shown. At block 902, the method 900 includes receiving a third party request. As discussed above in detail with block 802 of FIG. 8, the road condition monitoring system 102 can receive a data query or a price query from one or more third parties (e.g., the roadway manager system 104).

At block 904, the method 900 includes identifying a vehicle (e.g., a data source) having optimal roadway data. Said differently, the road condition monitoring system determines and/or selects a desired connected vehicle and/or a desired connected device optimally configured for capturing the roadway data for the third party request from the connected devices 106. For example, the road condition monitoring system 102 may identify a vehicle selected from the connected devices 106 that is capable of capturing roadway data corresponding to the third party request. In one embodiment, the processor 236 can identify which vehicle from the connected vehicle 202 or the other connected vehicles 204 is in close proximity to a location associated with the third party request. In another embodiment, a location and/or a position of the connected devices 106 is used to determine which connected device has an optimal view of the roadway condition and/or the weather condition. In other embodiments, the sensor technology and/or processing capabilities of the connected devices 106 are used to determine which device is capable of capturing the highest quality roadway data. In some embodiments, more than one vehicle having optimal roadway data is identified. Accordingly, the processor 236 can selectively determine which data sources are capable of providing the best roadway data corresponding to the third party request.

At block 906, the method 900 includes receiving the roadway data. For example, the road condition monitoring system 102 can receive the roadway data from the connected devices 106 identified as being optimally configured for capturing the roadway data for the third party request. Thus, the processor 236 can transmit a request for the roadway data to the connected devices 106 identified as having optimal roadway data. At block 908, the method 900 includes calculating a data price. As discussed above in detail with FIG. 8 and block 808, the processor 236 can calculate a price for the data based on the roadway data, the one or more roadway conditions, weather conditions, or driving conditions.

At block 910, the method 900 includes transmitting the data price to, for example, the roadway manager system 104 (i.e., in response to the third party request received at block 902). Thus, the processor 236 transmits an offer for sale of the roadway data at the data price to the processor 246. At block 912, it is determined if the data price was accepted. For example, the road condition monitoring system 102 can receive a confirmation from the roadway manager system 104 indicating acceptance of the price and authorization to execute the data transaction. Thus, in some embodiments, the processor 246 transmits a confirmation message to the processor 236. If the determination at block 912 is NO, the method 900 ends. If the determination at block 912 is YES, the method 900 proceeds to block 914 where the road condition monitoring system 102 can execute a data transaction for the roadway data at the data price. Accordingly, at block 916, the method 900 includes controlling access to the data according to the data transaction.

As an illustrative example, a third party (e.g., the roadway manager system 104) requests roadway data about an accident on a road segment. The road condition monitoring system 102 identifies a connected device 106 with optimal roadway data about the accident. For example, the road condition monitoring system 102 may determine a location of each of the connected devices 106 and determine which connected device is the closest (e.g., distance) to the accident and/or the road segment. In other embodiments, the road condition monitoring system 102 may identify a connected vehicle from the connected devices 106 that is the closest to the accident and/or road segment and has a particular type of sensor or number of sensors (e.g., more than five (5) image sensors). Thus, the processor 236 can evaluate the capabilities of the connected devices 106 to determine which connected devices has the ability to capture optimal roadway data.

The road condition monitoring system 102 can manage the payment to the identified connected devices and may negotiate a fee for acting as the crowdsourcing moderator. It is understood that in some embodiments, instead of dynamic pricing, a dynamic rewards system can be implemented by the road condition monitoring system. Thus, different reward values can be allocated to connected devices 106 based on the type of roadway data that the connected devices 106 can provide.

In another embodiment, the road condition monitoring system can aggregate roadway data from one or more connected devices 106 into one or more data packages. The road condition monitoring system can dynamically calculate a price and control allocation of the data packages. In one embodiment, the roadway data can be aggregated to optimize profits for each connected device 106 in a group and/or for the road condition monitoring system 102 (e.g., the OEM). As discussed above, in some embodiments, the third party request includes a data finder incentive offered by the roadway manager system 104 for finding and/or providing data and/or conditions of interest to the roadway manager system 104. Accordingly, in some embodiments, the roadway data can be aggregated to optimize the data finder incentive for the road condition monitoring system 102 and/or the connected devices 106. In some embodiments, calculating the price for the data package can also be based on the data finder incentive.

Figure 10:
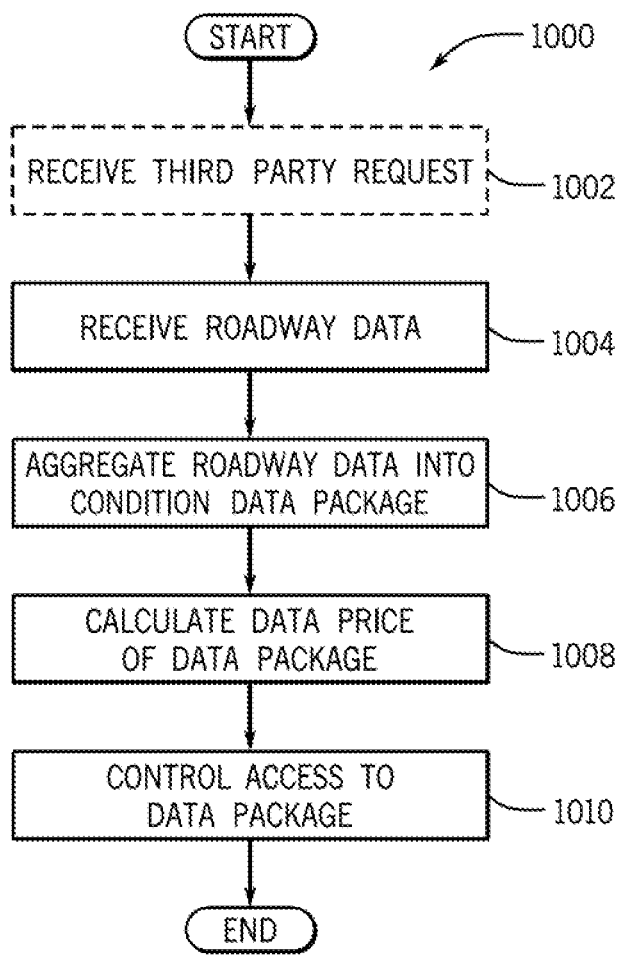
FIG. 10 is a process flow diagram of a method for dynamic data pricing and access according to another embodiment.

Referring now to FIG. 10, a method for dynamic data access and pricing according to another embodiments is shown. At block 1002, the method 1000 includes receiving a third party request. As discussed above in detail with block 802 of FIG. 8, the road condition monitoring system 102 can receive a data query or a price query from one or more third parties (e.g., the roadway manager system 104).

At block 1004, the method 1000 includes receiving roadway data. As discussed above in detail with FIG. 7 and block 702, the road condition monitoring system server 206 can receive roadway data from the connected vehicle 202 and the other connected vehicles 204. For example, the connected vehicle 202 can capture roadway data using the vehicle systems 218 and/or the sensors 220. The roadway data received is in alignment with the parameters of the third party request, for example, roadway data associated with a location defined in the third party request.

At block 1006, the method 1000 includes aggregating the roadway data into a condition data package. The road condition monitoring system 102 can aggregate the roadway data according to data source, data type, data granularity, location, among others. In one embodiment, each condition data package is associated with a different price determined at block 1008. Thus, the road condition monitoring system 102 can offer data packages at different price points. As discussed above, in some embodiments, aggregating the roadway data into a condition data package can be based on the data finder incentive to optimize profits for the roadway condition monitoring system 102 and/or the connected devices 106.

At block 1008, the method 1000 includes calculating a data price for the condition data package. For example, the price for the roadway data can be based on one or more of the following, time (e.g., time of day, time of the request), demand for data (e.g., number of third parties requesting the data at a particular time), data granularity, type of data, data source, data aggregation (e.g., data packages), location associated with the roadway data, condition associated with the roadway and/or the third party request, among others. In one embodiment, calculating the data price for the condition data package can be based on the data finder incentive offered by the roadway manager system 104. For example, a discount on the data price can be calculated based on the data finder incentive. At block 1010, the method 1000 includes controlling access to the condition data package.

Figure 11:
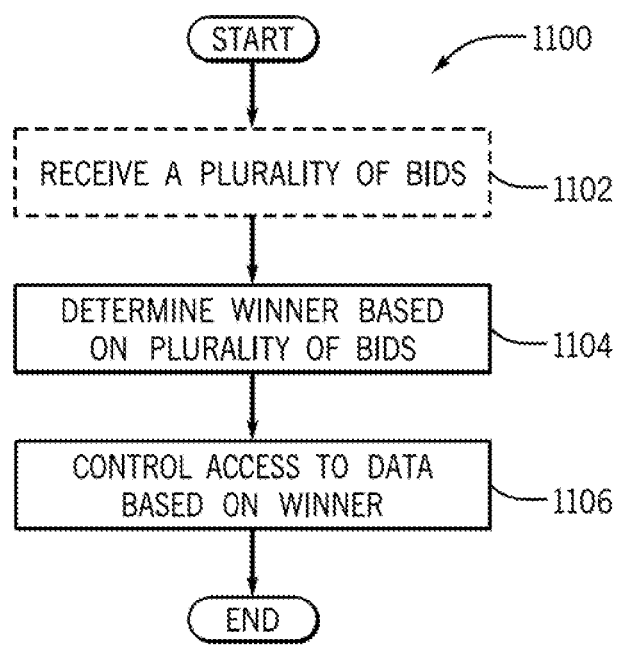
FIG. 11 is a process flow diagram of a method for dynamic data pricing and access according to another embodiment.

In an embodiment where more than one third party requests the same or similar data at the same or similar time, the road condition monitoring system 102 can also implement dynamic and real-time auction of the data. Thus, the road condition monitoring system 102 is a moderator that manages data requests (e.g., bids) between at least a first computing system (e.g., a first third party) and a second computing system (e.g., a second third party) and allocates access to the data based on the winner of the auction. In some embodiments, the winner of the auction is the third party that offers the highest bid. Referring now to FIG. 11, a method 1100 for dynamic data access and pricing according to another embodiment is shown. At block 1102, the method 1100 includes receiving a plurality of bids. For example, the road condition monitoring system 102 can receive a plurality of third party requests, each from a different third party that includes at least a bid price or a bid range.

At block 1104, the method 1100 includes determining a winner based on the plurality of bids. In one embodiment, the road condition monitoring system 102 determines a winning bid from the plurality of bids wherein the winning bid is the highest bid from the plurality of bids. In another embodiment, the road condition monitoring system 102 selects a third party from a plurality of third parties having the highest bid. At block 1106, the method 1100 includes controlling access to the data based on the winner. In one embodiment, the road condition monitoring system 102 controls access to the roadway data by transmitting the roadway data to a third party server associated with the winning bid.

In a further embodiment, the road condition monitoring system 102 can provide market information to third parties. For example, the roadway data can include the vehicle models and/or vehicle OEMs. The road condition monitoring system 102 can monitor the vehicle models and/or vehicle OEMs for a particular road segment, a particular time, a particular day, and over a particular time period. Thus, real time market and/or advertising information can be provided to third parties.

The embodiments discussed herein can also be described and implemented in the context of computer-readable storage medium storing computer executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data. Computer-readable storage media excludes non-transitory tangible media and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the above-disclosed.

The invention claimed is:

1. A computer-implemented method for road condition monitoring, comprising:
   receiving a plurality of third party requests from a plurality of third party servers, wherein each of the plurality of third party requests includes a query for data with parameters defining characteristics of the data;
   determining a desired connected vehicle that is capable of capturing a highest quality of the data from a plurality of connected vehicles based on technological capabilities of each of the plurality of connected vehicles according to the plurality of third party requests;
   receiving roadway data from the desired connected vehicle based on the plurality of third party requests;
   determining a roadway condition based on the roadway data;
   calculating a data price for the roadway data as a function of data granularity of the roadway data and based on the roadway condition, wherein the data granularity is a level of data transformation from raw roadway data to transformed roadway data;
   transmitting the data price to the plurality of third party servers;
   receiving a plurality of bids for the roadway data from a plurality of third party servers;
   determining a winning bid from the plurality of bids wherein the winning bid is a highest bid from the plurality of bids;
   executing a data transaction for the roadway data according to the winning bid; and
   transmitting the roadway data to a third party server from the plurality of third party servers associated with the winning bid, and wherein the third party server controls dispatch of one or more vehicles using the roadway data.

2. The computer-implemented method of claim 1, wherein the plurality of third party requests includes at least one of a location, a time, data granularity, or data type.

3. The computer-implemented method of claim 1, wherein calculating the data price includes calculating the data price based on a data capture quality of a sensor of the desired connected vehicle used for capturing the roadway data.

4. The computer-implemented method of claim 1, including aggregating roadway data from the plurality of connected vehicles into a plurality of data packages and calculating the data price based on the road condition and the plurality of data packages.

5. The computer-implemented method of claim 1, including determining a priority level of the roadway condition based on the roadway data and calculating the data price based on the roadway condition and the priority level.

6. A system for road condition monitoring, comprising:
   a plurality of connected devices for sensing roadway data; and a processor operatively connected for computer communication using a communication network to the plurality of connected devices, wherein the processor:
   determines a desired connected vehicle that is capable of capturing a highest quality of the roadway data from the plurality of connected devices based on technological capabilities of each of the plurality of connected devices according to a third party request;
   receives roadway data from the desired connected vehicle based on the third party request;
   determines a roadway condition based on the roadway data;
   calculates a data price for the roadway data as a function of data granularity of the roadway data and based on the roadway condition, wherein the data granularity is a level of data transformation from raw roadway data to transformed roadway data;
   receives a plurality of bids for the roadway data from a plurality of third party servers;
   selects a third party server from the plurality of third party servers having a highest bid;
   executes a data transaction of the roadway data with the selected third party server according to the data price, including transmitting the roadway data to the third party server, wherein the third party server controls dispatch of one or more vehicles using the roadway data.

7. The system of claim 6, wherein the processor calculates the data price based on a source of the roadway data.

8. A non-transitory computer-readable storage medium including instructions that when executed by a processor, causes the processor to:
   receive a plurality of third party requests from a plurality of third party servers, wherein the third party requests includes a query for data with parameters defining characteristics of the data;
   determine a desired connected vehicle that is capable of capturing a highest quality of the data from a plurality of connected vehicles based on technological capabilities of each of the plurality of connected vehicles according to the plurality of third party requests;
   receive roadway data from the desired connected vehicle based on the third party requests;
   determine a roadway condition based on the roadway data; calculate a data price for the roadway data as a function of data granularity of the roadway data and based on the roadway condition, wherein the data granularity is a level of data transformation from raw roadway data to transformed roadway data;
   transmitting the data price to the plurality of third party servers;
   receiving a plurality of bids for the roadway data from the plurality of third parties;
   determining a winning bid from the plurality of bids wherein the winning bid is a highest bid from the plurality of bids;
   execute a data transaction of the roadway data a third party server from the plurality of third party servers associated with the winning bid, including transmitting the roadway data to the third party server, wherein the third party server controls dispatch of one or more vehicles using the roadway data.

* * * * *